United States Patent [19]
Hirata et al.

[11] Patent Number: 5,113,520
[45] Date of Patent: May 12, 1992

[54] DATA PROCESSOR ENABLING PRIORITIZING OF CONCURRENT TASKS

[75] Inventors: Keiichi Hirata, Kuwana; Tomohiro Ban, Iwakura; Atsuko Kawasumi, Nagoya; Kazuko Nakagawa, Chita; Yukimi Mizutani, Ichinomiya; Satoru Tsuruki, Nagoya, all of Japan

[73] Assignee: Brother Kogyo Kabushiki Kaisha, Aichi, Japan

[21] Appl. No.: 427,911

[22] Filed: Oct. 24, 1989

Related U.S. Application Data

[63] Continuation of Ser. No. 122,365, Nov. 18, 1987, abandoned.

[30] Foreign Application Priority Data

Nov. 20, 1986 [JP] Japan .............................. 61-277172

[51] Int. Cl.⁵ .................... G06F 13/14; G06F 13/26
[52] U.S. Cl. .................................. 395/650; 364/236;
364/241.4; 364/242.8; 364/260; 364/936;
364/937; 364/941.6; 364/942.5; 364/DIG. 1;
395/115
[58] Field of Search ... 364/200 MS File, 900 MS File,
364/519; 400/51, 52

[56] References Cited

U.S. PATENT DOCUMENTS

| | | | |
|---|---|---|---|
| 4,026,402 | 5/1977 | Byrd | 364/900 |
| 4,087,852 | 5/1978 | Campbell et al. | 364/200 |
| 4,458,311 | 7/1984 | Clements et al. | 364/200 |
| 4,464,730 | 8/1984 | Lawrence et al. | 364/900 |
| 4,480,314 | 10/1984 | McKelley, Jr. et al. | 364/900 |
| 4,545,015 | 10/1985 | Baunach et al. | 364/200 |

OTHER PUBLICATIONS

Martin Reiffin, "A Real Time Compiler System", Microcomputing, Jul. 1983.

Primary Examiner—Thomas C. Lee
Assistant Examiner—Ken S. Kim
Attorney, Agent, or Firm—Oliff & Berridge

[57] ABSTRACT

A data processor for speedier processing of input data includes a data processing system for executing a text editing process and a text printing process by the time slice method and a preference control unit for selecting between the above processes. When data is entered into the processor, the entering process or text editing process is generally preferred to the text printing process. Therefore, no delay occurs in inputting data through a keyboard from data entry to its display. If desired, it is possible to prefer the text printing process to the text editing process.

18 Claims, 10 Drawing Sheets

FIG. 7

```
BG print ABC
FG print
print reservation 1 ABC    ☐
print reservation 2 XYZ    ②
print reservation 3 AAA    ①
print reservation 4 CCC    ☐
print reservation 5 BBB    F
```

FIG. 8

```
BG print
FG print ABC
print reservation 1 ABC    F
print reservation 2 BBB    F
print reservation 3 AAA    ☐
print reservation 4 XYZ    ☐
print reservation 5 CCC    ☐
```

Dear Mr. YAMADA
Thank you for your lett..

Dear Mr. YAMANAKA
Thank you for your lett..

DATA PROCESSOR ENABLING PRIORITIZING OF CONCURRENT TASKS

This is a continuation of application Ser. No. 07/122,365 filed Nov. 18, 1987, now abandoned.

BACKGROUND OF THE INVENTION

This invention relates to a data processor which is adaptable to an electronic typewriter and a word processor.

A word processor executes simultaneously a text editing process and a printing process. In the former process, key code data input from a keyboard is stored in an input memory in order to edit a text. In the latter process, the data stored in the memory is output to a printer. These two processes are alternately dispatched by a time slice method under the control of a CPU.

However, in this case, key, code data processing in the input memory must wait while processing is simultaneously executed for printing, so the key, code data are temporarily stored in a key buffer. As a result, the key code data entry lags behind quick keying so that a time lag occurs between the keying of data and displaying the data on the screen. If the capacity of the key buffer is too small, key code data entered after the buffer becomes full are lost. It is costly to provide a buffer having a large capacity to prevent this.

SUMMARY OF THE INVENTION

An object of the invention is to provide a data processor in which the process of inputting data is preferred to the outputting of print data to a printing device when data is being input to the processor, thereby assuring faster and smoother key input without irritating the operator.

Another object of the invention is to provide a data processor in which it is possible to prefer either one of: (a) processing of input data, or (b) delivering of print data to the printing device.

Still another object of the invention is to provide a data processor which executes an instantaneous printing of a page in a text.

As shown in FIG. 1, a data processor for speedier input according to the invention includes an input device 1; an output port 2; memory 3 for storing data; a data processing system 4 for simultaneously executing two processes, one being responsive to an input from the input device 1 to process the input data and the other to deliver output data stored in the memory 3 to the output port 2; and a preference control unit 5 for preferring the data processing of the input data in the data processing system 4 to the data delivery processing when the input at the input device is busy.

BRIEF DESCRIPTION OF THE DRAWINGS

For a more complete understanding of the present invention and the advantages thereof, reference is now made to the following description taken in conjunction with the accompanying drawings in which:

FIGS. 7 and 8 are explanatory views of a print reservation screen;

DETAILED DESCRIPTION OF THE INVENTION

Figure 1:
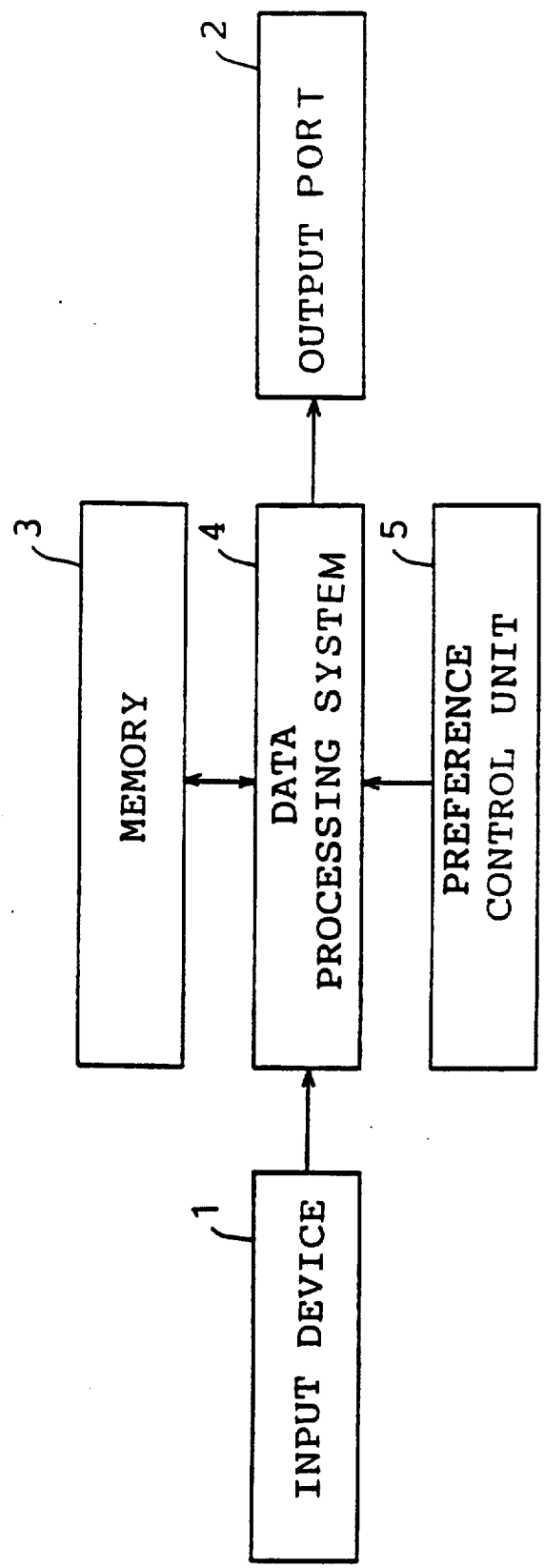
FIG. 1 is an explanatory view of this invention.
Figure 2:
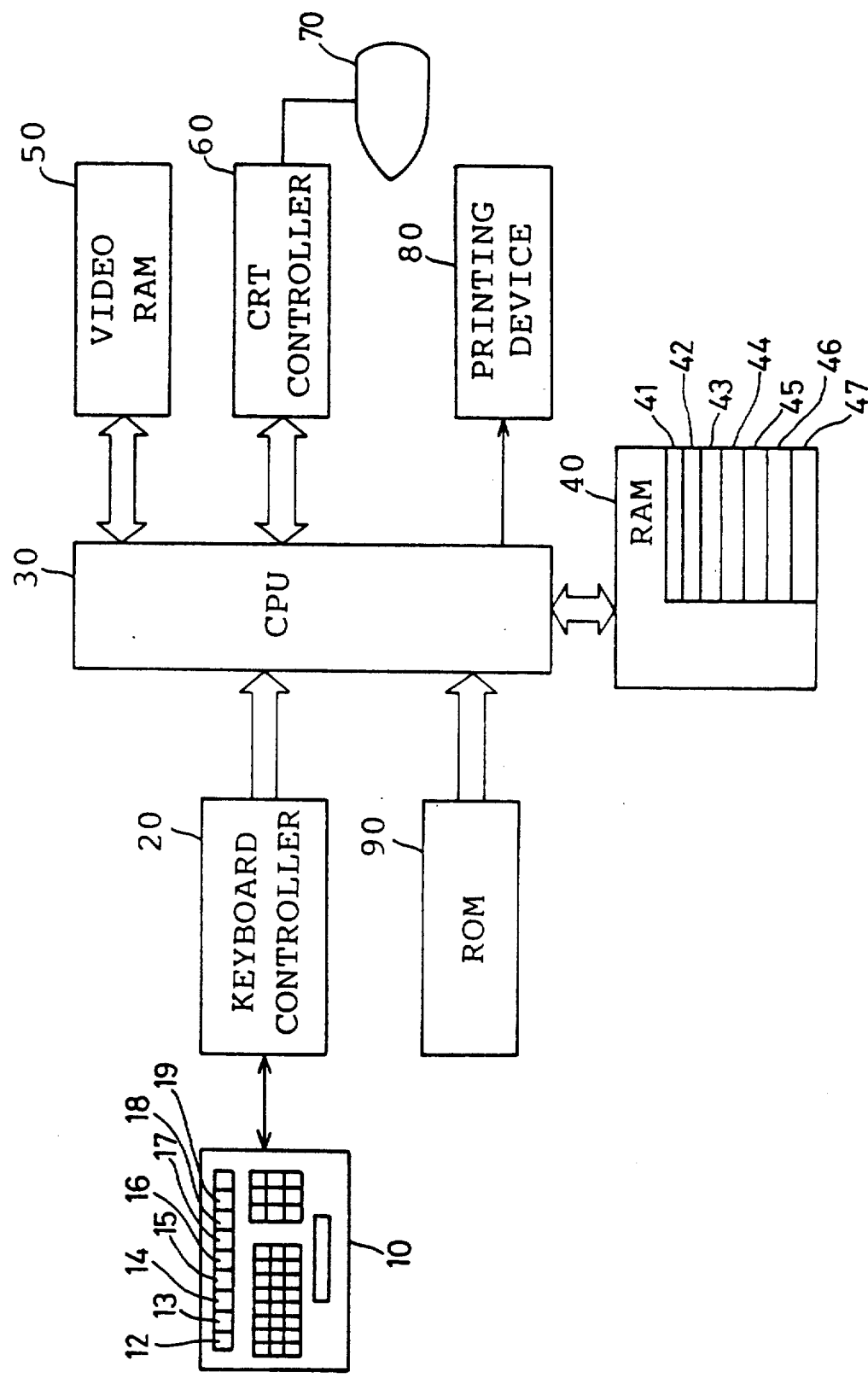
FIG. 2 is a block diagram of an electronic typewriter in an embodiment of this invention.

FIG. 2 is a block diagram of an electronic typewriter having a data processor according to this invention. A keyboard 10 includes character keys (e.g., letter (alphabet) keys and numeral keys), function keys (e.g., cursor moving keys), a space key and a return key. The keyboard 10 further includes: text editing start and end keys 12 and 13 for editing text; print reservation start and end keys 14 and 15 for reserving printing of a text; a page printing key 16 for printing a desired page of text; an index key 17 for displaying an index screen; a print execute key 18 for printing text specified by a cursor in the index screen; and a print cancel key 19 for stopping printing.

A keyboard controller 20 senses a key pressed down by an operator, and transfers the corresponding key code data to a CPU 30.

The CPU 30 executes, based on programs previously stored in ROM 90, various logic operations for functions of the typewriter, e.g., input and output processes of character code data, a text editing process and a printing process. The CPU 30 further includes a control facility for executing the text editing process in preference to the printing process.

The CPU 30 is connected to ROM 90, RAM 40, video RAM 50, a CRT controller 60 and a printing device 80 by a common bus (not shown), through which control signals, data signals, and address signals are transferred.

The RAM 40 includes: a key buffer 41 in which key code data from the keyboard controller 20 are stored; a key code counter 42 which counts key code data; a cursor pointer (not shown) which stores data for showing a cursor position; a KC flag 43 indicating whether the key buffer 41 stores any key code data; a FG flag 44 indicating whether there is text reserved to be foreground-printed (explained later); a print reservation memory 46 which stores names of text files or a page number of a text file reserved to be printed, and their printing order priority; a text memory 47 which stores a plurality of text files of data processed from the data input from the keyboard; and a printing data memory 45 which stores print data of plural text files or specified page of a text file selected from the text files stored in the text memory 47 corresponding to the text file names or the page number in the print reservation memory 46.

The video RAM 50 is a display buffer which temporarily stores the data of one screen display on a CRT (Cathode Ray Tube) 70. The memory address of the video RAM 50 coincides with the display address of the CRT 70 on a one-to-one basis. The CRT controller 60 includes a character generator (not shown) which produces the CRT display characters. The character generator stores a character font (a character pattern). The CRT controller is connected with the video RAM 50.

A key code data from the keyboard controller 20 is stored in the key buffer 41 as well as at a specified address in the video RAM 50 under the control of the CPU 30. Then, the CRT controller 60 reads the data from the video RAM 50, and makes the CRT 70 display a character corresponding to the data, whose pattern is stored in the character generator.

The printing device 80 includes: a type wheel, a printing hammer, and a printing ribbon which are provided on a carriage moving along a platen; a driving circuit for the printing hammer; a driving circuit for the printing ribbon; a type wheel motor and the motor driver; and a subordinate CPU which outputs control signals to the circuits and drivers according to print data from the main CPU 30. The type wheel is rotated to select an appropriate character, and the hammer strikes the selected character via the ribbon to print the character on a paper. The subordinate CPU outputs a print end signal to the main CPU 30 when the printing action is finished. As the print device, a thermal printer or a wire dot printer is available instead of the type wheel printer.

OPERATION

Figure 3A:
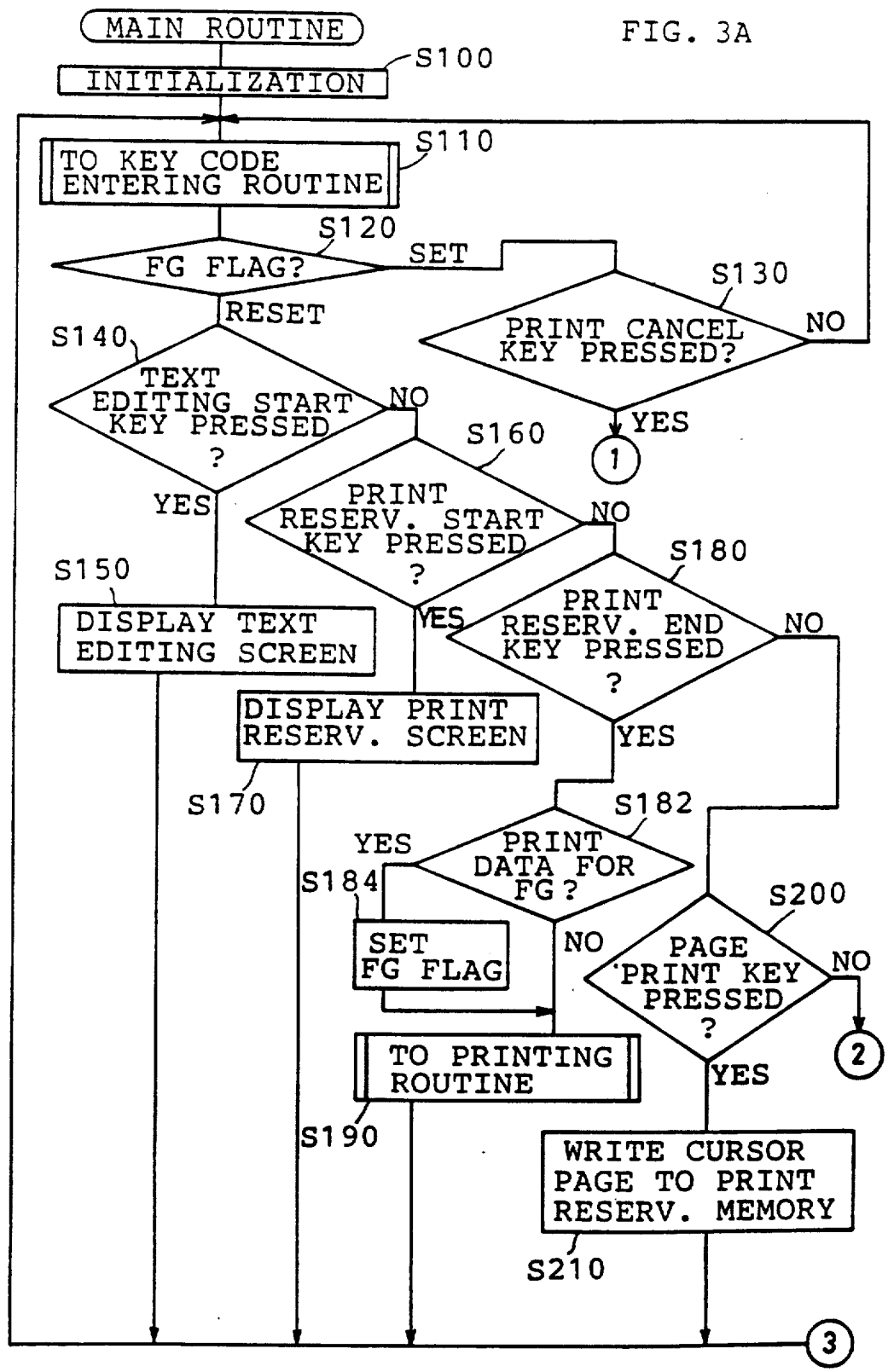
FIG. 3A and 3B together illustrate a flowchart of a main routine of the electronic typewriter.

As shown in FIG. 3A, when the electronic typewriter is turned on, the CPU 30 starts the main routine. At Step 100 (S100), initialization is executed, i.e., KC flag 43, FG flag 44, key buffer 41, and key code counter 42 are reset. At S110, the process step jumps to a key code entering routine.

Figure 4:
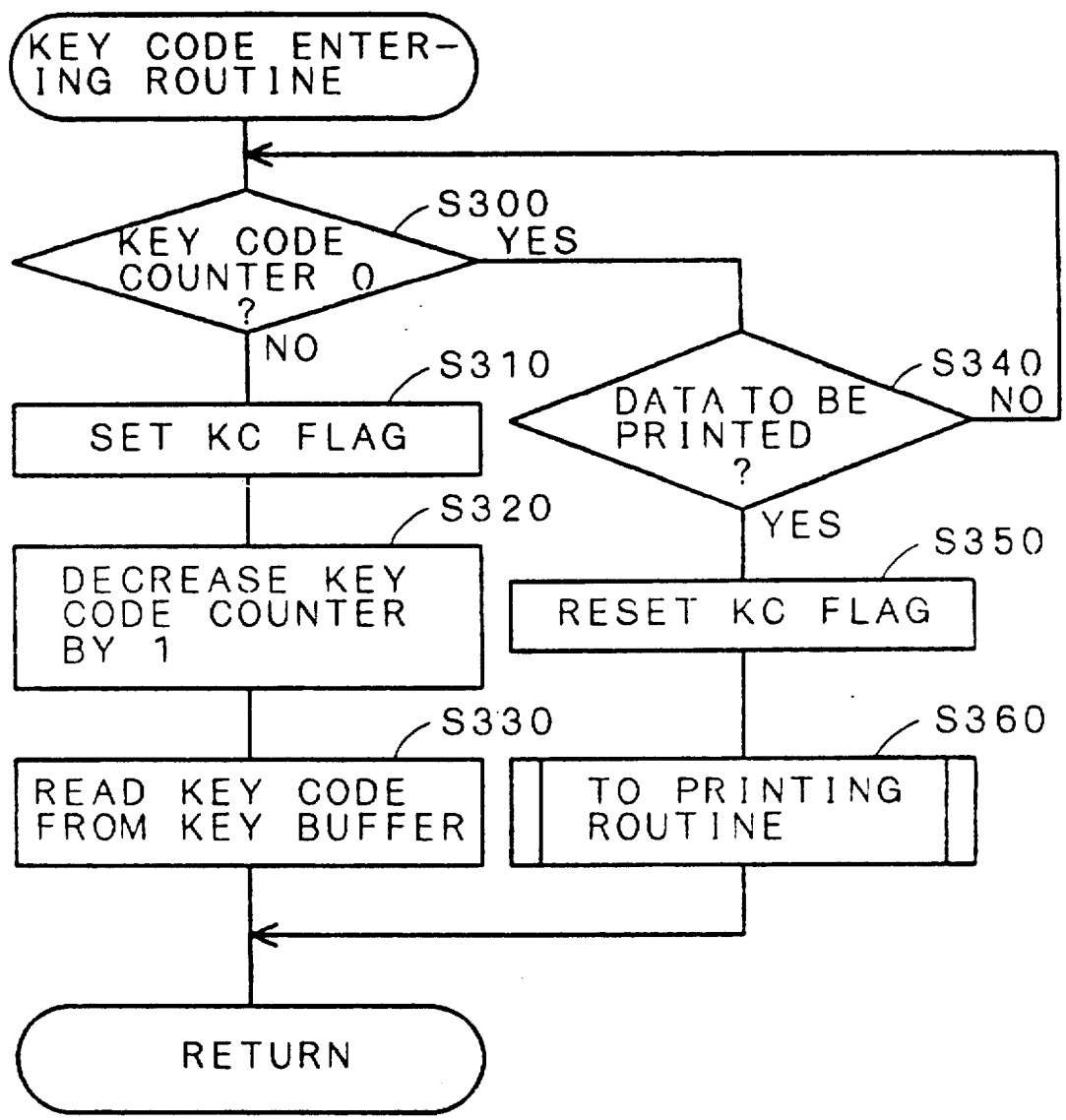
FIG. 4 is a flowchart of a routine for entering key code data.

As shown in FIG. 4, the key code entering routine determines whether the value of key code counter 42 is 0 at step S300. If the value is 0, i.e., if the keyboard 10 is not operated, then the process step proceeds to S340. At S340, it is determined whether the print data memory 45 has any print data i.e. whether there is any text to be printed. If no printing is to be done, the process step returns to S300. If there is data to be printed, the process step proceeds to S350 where the KC flag 43 is reset, and then jumps to a printing process routine at S360.

Figure 5:
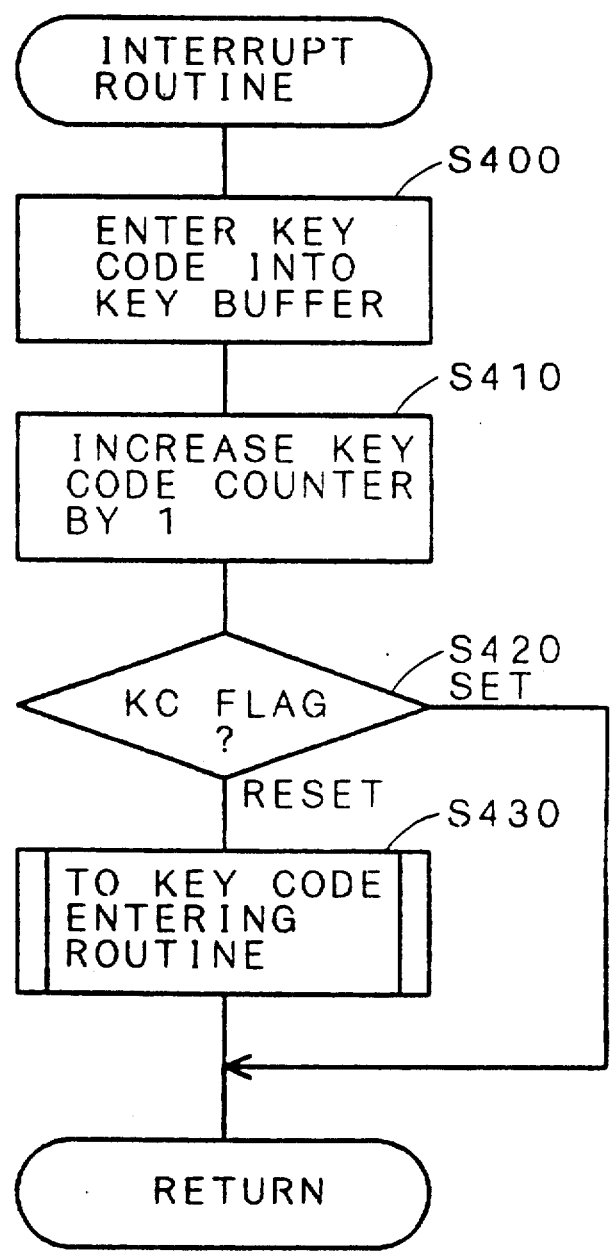
FIG. 5 is a flowchart of an interrupt routine.

If the keyboard 10 is operated at S300, the process step enters an interrupt routine shown in FIG. 5. At S400, the key buffer 41 stores a key code data corresponding to the operated key from the keyboard controller 20. At S410, the value of the key code counter 42 is increased by 1. At S420, the KC flag is checked and if KC flag 43 is reset, the process step jumps to the key code entering routine at S430. If it is determined that the KC flag 43 is set, the interrupt routine is terminated and the former process resumes. In this routine, when a key code data is operated on keyboard 10, the key code data is stored in key buffer 41, and the value of key code counter 42 is increased by 1.

Accordingly, when a key code data is input, it is determined that the value of key code counter 42 is not 0 at S300 of the key code entering routine. The process step proceeds to S310 where the KC flag 43 is set. At S320, the value of the key code counter 42 is decreased by 1. At S330, the key code data is read from the key buffer 41, and the process step returns to S120 of the main routine (FIG. 3A).

At S120, it is determined whether FG flag 44 is set or reset. If it is determined that FG flag 44 is reset, i.e., if printing is not operated by a foreground processing procedure, the process step proceeds to S140 where it is determined whether the text editing start key 12 is pressed. If the key 12 is pressed, a screen for editing a text is displayed on the CRT 70 at S150. Then, the operator inputs the name of the text to be edited from the keyboard 10. If the text editing start key 12 is not pressed at S140, the process step proceeds to S160.

At S160, it is determined whether the print reservation start key 14 is pressed. If it is determined that the key 14 is pressed, the process step proceeds to S170 where the names of the text files reserved to be printed and the order of the priority thereof is displayed on the CRT 70, as shown in FIG. 7. If the key 14 is not pressed, the process step proceeds to S180.

Figure 6:
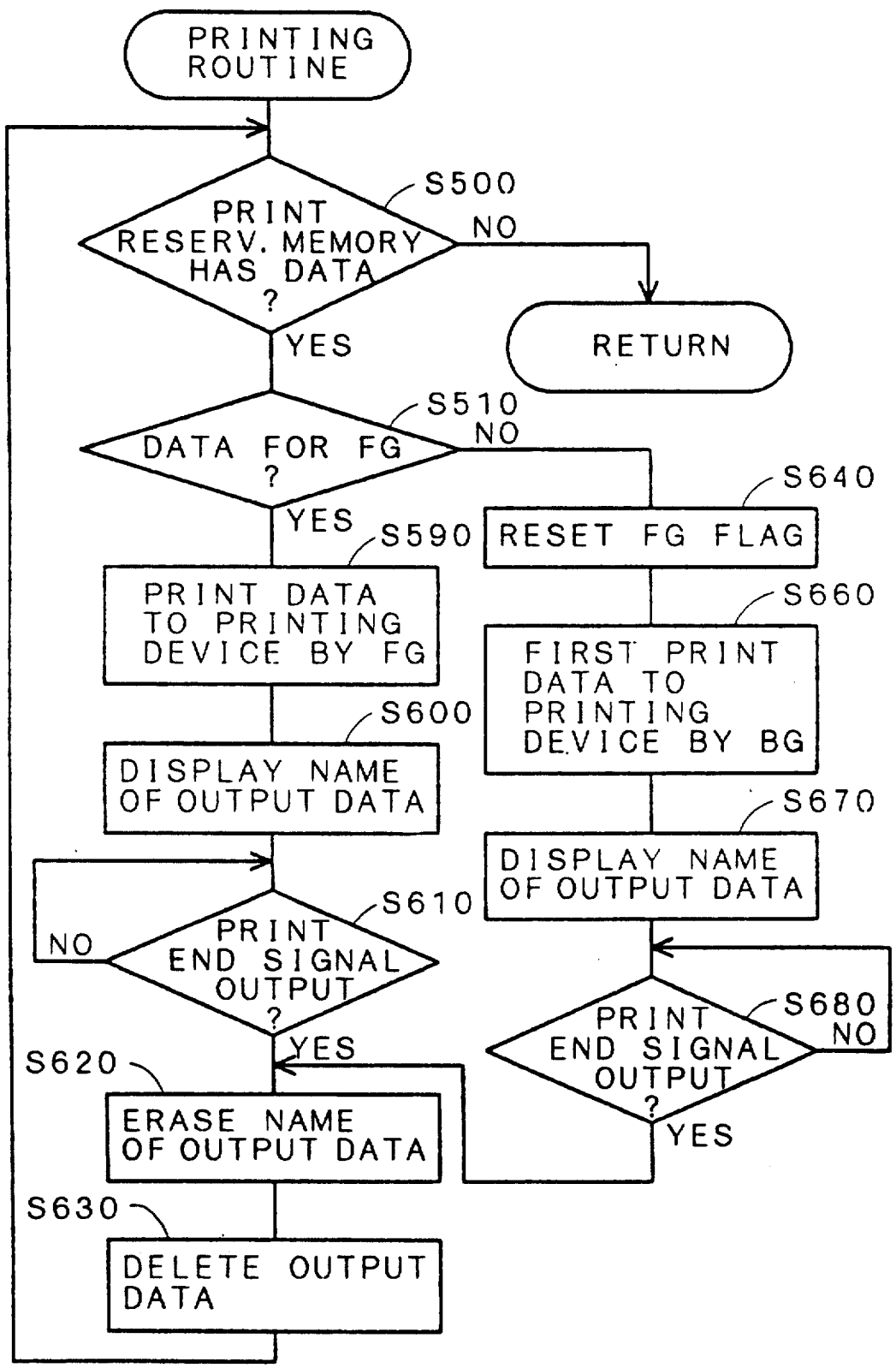
FIG. 6 is a flowchart of a routine for printing data.

At S180, it is determined whether the print reservation end key 15 is pressed. If the key 15 is pressed, at S182, it is determined whether the print reservation memory 46 has any text identification data to be printed by the foreground printing process. As shown in the print reservation screen of FIG. 8, "F" in a square on the right of a name of a text such as "ABC" shows that the text is to be printed by the foreground printing process. If the print reservation memory 46 has such data of text, the FG flag 44 is set at S184. If the memory 46 does not have such data, the process step proceeds to S190 and jumps to the printing routine (FIG. 6).

At S180, if the print reservation end key 15 is not pressed, the process step proceeds to S200.

At S200, it is determined whether the page print key 16 is pressed. If the key 16 is pressed, the process step proceeds to S210. At this step, a name of a text file and the page number thereof on which the cursor is situated are written in the print reservation memory 46. Simultaneously, the print data in that page are stored in the print data memory 45. If the key 16 is not pressed at S200, the process step proceeds to S220.

At S220, it is determined whether the text editing end key 13 is pressed. If the key 13 is pressed, at S230, the CRT 70 displays a screen for registering the edited text. If the key 13 is not pressed, the process step proceeds to S240.

At S240, it is determined whether the index key 17 is pressed. If the key 17 is pressed, at S250, the CRT 70 displays a screen showing index. If the key 17 is not pressed, the process step proceeds to S260.

At S260, it is determined whether the print execute key 18 is pressed. If the key 18 is pressed, the name of the text file pointed by the cursor in the index screen is stored in the print reservation memory 46 at S270. Simultaneously, the print data of the text file are written in the print data memory 45. At S290, the process step jumps to the printing routine where the reserved text is printed.

At S260, if the print execute key 18 is not pressed, the process step proceeds to S280 where it is further determined whether the print cancel key 19 is pressed. If the key 19 is not pressed, at S294, other operations, e.g., cursor movement, are executed in response to operating of the corresponding key. If the cancel key 19 is pressed, the printing by the printing device 80 is stopped at S292. Simultaneously, the name of the printed text is deleted from the print reservation memory 46, and the print data of the text is deleted from the print data memory 45. Thus, printing is executed during every sliced time period when the keyboard 10 is not operated.

At S120, if the FG flag 44 is determined to be set, it is determined whether the print cancel key 19 is pressed at S130. If the key 19 is pressed, the printing is stopped at S292. Simultaneously, the name of the printed text is deleted from the print reservation memory 46 and the print data of the text is deleted from the print data memory 45.

If the FG flag 44 is set at 120 and if the cancel key 19 is not pressed at 130, the process step returns to S110 and the key code entering routine is executed. operated. In this case, only the print cancel key 19 is effective.

After steps S150, S170, S190, S210, S230, S250, S290, or S294, the process step returns to S110 and the above-mentioned operations are repeated.

Next, the printing routine is explained referring to FIG. 6.

First, at S500, it is determined whether the print reservation memory 46 has any text identification data to be printed. If this memory 46 has such data, the process step proceeds S510. If this memory 46 has no data, the process step returns to the main routine. At S510, it is determined whether reservation memory 46 has any identification data of text to be printed by the foreground printing process. If this memory 46 has such data, the process step proceeds to S590.

At S590, the print data of text to be printed by the foreground printing process are output to the printing device 80. At S600, as shown in FIG. 8, the name of text, whose print data is output to the printing device 80, is displayed on the right of "FG print" in the print reservation screen. At S610, it is determined whether the print end signal is output from the printing device 80. When this signal is output from the printing device 80, the process step proceeds to S620.

At S620, the name of text such as "ABC", whose print data are output to printing device 80, is deleted from the print reservation screen. At S630, the name of the text and the corresponding data are deleted from print reservation memory 46, and the remaining data in the memory 46 are moved up by one in the order. Simultaneously, the print data of the same text is deleted from print data memory 45, and the process step returns to S500.

At S510, if it is determined that print reservation memory 46 has no identification data to be printed by the foreground printing process, the process step then proceeds to S640 where the FG flag 44 is reset. At S660, the print data, corresponding to the first data in the print reservation memory 46, are output from the print data memory 45 to the printing device by the background process. At S670, as shown in FIG. 7, the name of text being printed, e.g., "ABC", is displayed on the right of "BG print" in the print reservation screen.

At S680, it is determined whether the print end signal is output from the printing device 80. If this signal is output from the printing device 80, the process step jumps to S620 where the name of the text, whose print data are output to the printing device 80, is deleted from the print reservation screen. At S630, the name of the text and the corresponding data are deleted from the print reservation memory 46, and the remaining data in the memory 46 are moved up by one in the order. Simultaneously, the print data of the same text are deleted from the print data memory 45.

Accordingly, when the print reservation is desired, the print reservation start key 14 is pressed. Then the print reservation screen is displayed on the CRI 70. By inputting the names of the text files which are desired to be printed, such as "ABC", "XYZ", these names are sequentially written on the screen. Squares for setting the foreground printing and changing the print order are provided on the right of the text names. The print order beginning with "1" can be written in the squares. If a text is desired to be printed in the foreground, "F" is written in the square of the same text. If the printing of a text is desired to be canceled, "C" is written in the square of the same text.

When the print reservation end key 15 is pressed while displaying a print reservation screen as shown in FIG. 7, the screen is changed as shown in FIG. 8. Namely, the text name "ABC", which is being printed in the background process, is moved from the position after "BG print" to "FG print". In the priority of printing, "BBB" marked "F" is moved to the second place, "AAA" marked "1" is moved to the third place, and "XYZ" is moved to the fourth place. The "ABC" in printing is automatically marked "F".

In the case where print reservation memory 46 has data to be printed by the foreground printing process, (the text name is marked "F" on its right side in the print reservation screen), the FG flag 44 is set, and the text is foreground printed. While the foreground printing is executed, only the print cancel key 19 is effective as explained before in the main routine. Since the other keys (i.e., the text editing start and end keys 12 and 13, the print reservation start and end key 14 and 15, the page print key 16, the index key 17, and the print execute key 18) are inoperative, printing is effectively executed without delay by those key operations. On the other hand, if the FG flag 44 is reset, the background printing is executed, i.e., printing is executed only while key operation is not executed. Namely, text editing is preferred to the background printing process.

The text name with "C" is deleted from the print reservation memory 46. Simultaneously, the corresponding print data is deleted from the print data memory 45.

The print data stored in the print data memory 45 corresponds to each of the text names or the text name and the page number stored in the print reservation memory 46. Therefore, even if print data of a text is corrected just before or during printing the text, the uncorrected print data, which exist in the print data memory 45 when the text name is written in the print reservation memory 46, are printed.

Figure 3B:
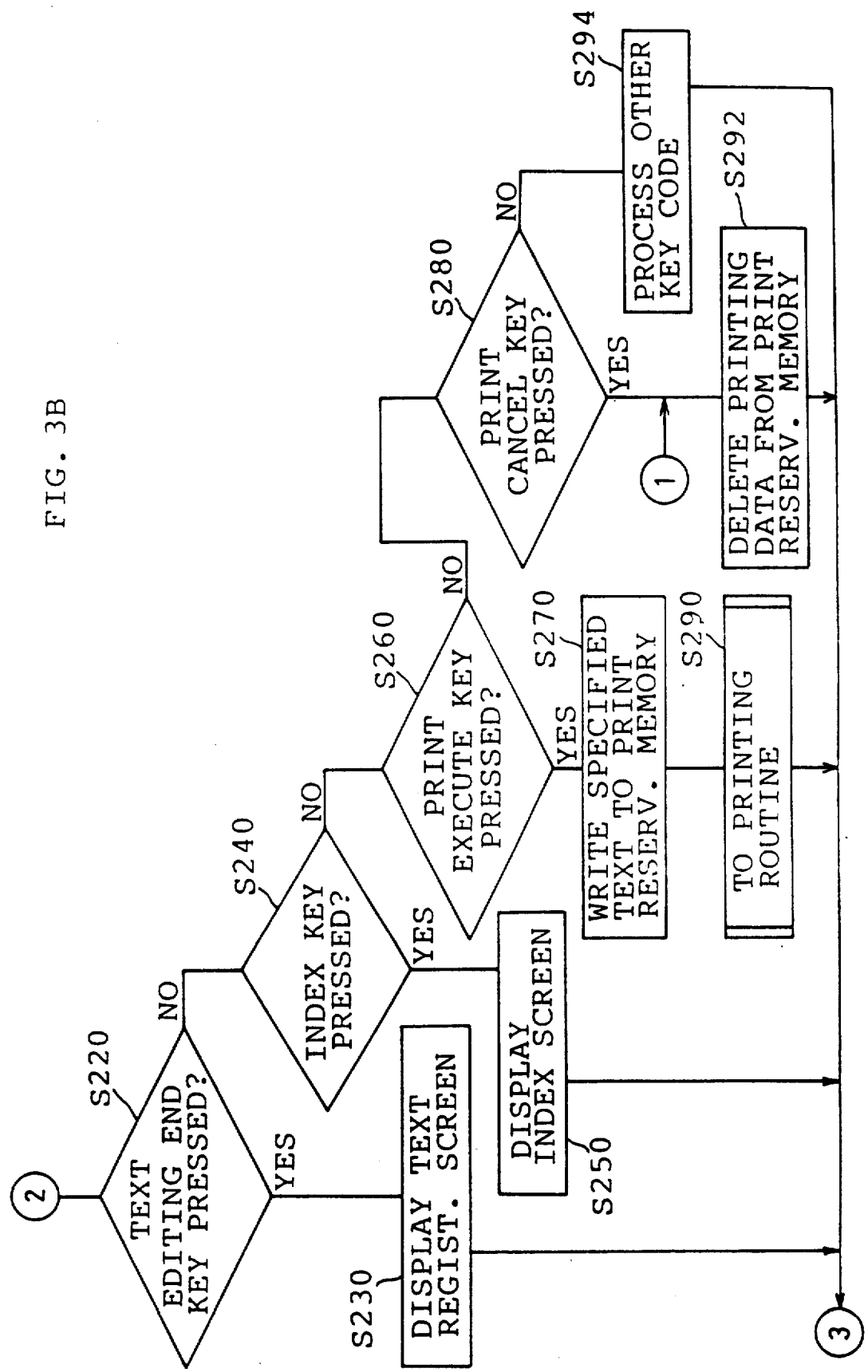

In this embodiment, the main routine includes processes for determining that the print cancel key 19 is pressed and deleting the data being printed from the print reservation memory, as shown in FIGS. 3A and 3B. Preferably these processes may be executed after reading data from the key buffer 41 in the key code entering routine, thereby decreasing the processing steps in the main routine. Particularly, if a key effective during the foreground printing process, i.e., the print cancel key 19, is processed in the key code entering routine, the speed of this process becomes higher than in the case where this process is executed by the main routine having many determination steps and other process steps. Therefore, wasteful printing can be stopped earlier.

Figure 9:
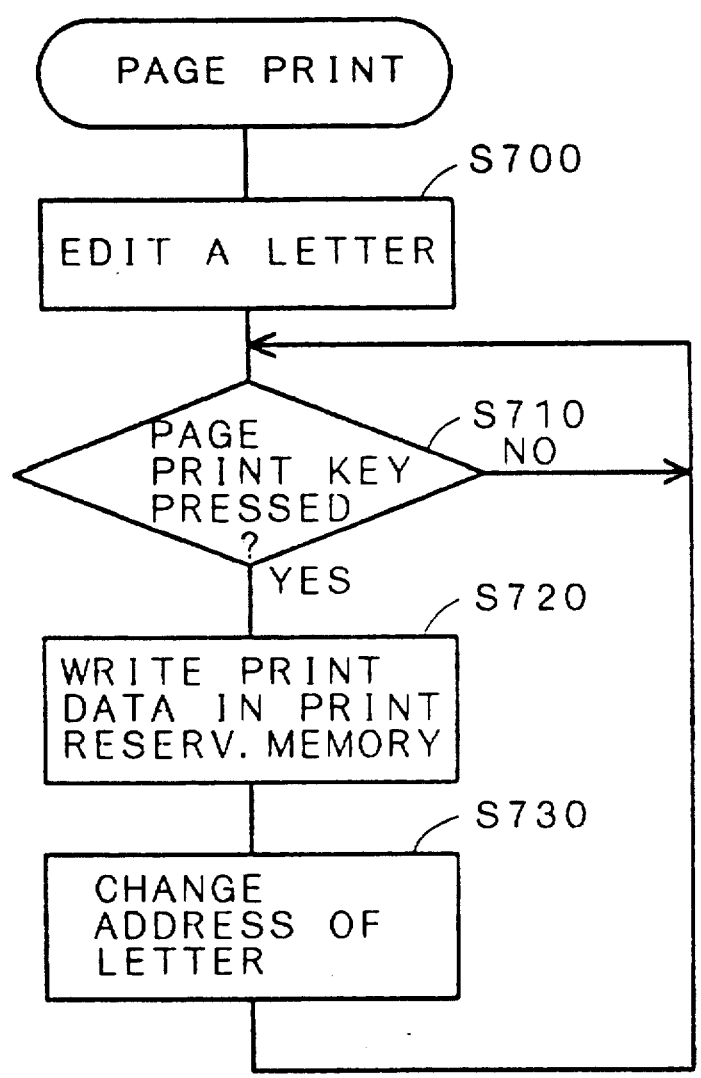
FIG. 9 is a flowchart of an embodiment of page printing according to this invention.
Figure 10:
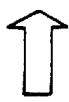
FIG. 10 is an explanatory view of a text screen of the embodiment.

FIG. 9 is a flowchart for printing a letter/document several times with a changing address. First, at S700, a letter such as shown in FIG. 10 is edited by using the character keys in the text editing screen, and its text name is registered. Then, when the page print key 16 is pressed, the process step proceeds from S710 to S720. At S720, as shown by steps S200 and S210 in the main routine of FIG. 3A, print data of the page where the cursor exists at that time are stored in the print data memory 45. Simultaneously, the text name and page number are automatically written in the print reservation memory 46. If the print reservation memory 46 has data, the process step jumps from the main routine or from the key code entering routine to the printing routine. Print data corresponding to the text name and page number in the print reservation memory 46 are output from the print data memory 45 to the printing device 80 by the background process, and printing is executed by the printing device 80. Therefore, after pressing the page print key 16, by changing the address of the letter as shown in FIG. 10 at S730 and pressing again the page print key 16 at S710, the letter having a new address is printed. Therefore, it is possible to print a desired page during editing of the text without finishing the text editing process. The print reservation screen has the text name and page number of the data printed by means of the page print key 16. In this case, merge printing is useful. Namely, this printing can be executed more easily by specifying a merge record in the text out of a merge file and pressing the print key 16. In the embodiment of FIG. 9, the printing of letters/documents can be processed by the foreground processing procedure by specifying this in the print reservation display screen.

Although the invention has been described and illustrated in detail, it is to be understood that the above description is by way of illustration and example only and other embodiments of subject invention will be apparent to those skilled in the art. The spirit and scope of this invention are to be limited only by terms of the appended claims.

What is claimed is:

1. A data processor for processing of key input data comprising:
   a keyboard for inputting data;
   a printing device;
   a data memory for storing data inputted from the keyboard;
   data processing means connected to the keyboard, the data memory and the printing device for executing at least a data store process and a data delivery process, said data store process storing data inputted from the keyboard in the data memory and said data delivery process delivering data stored in the data memory to the printing device; and
   preference means connected to the data processing means for selecting between a first mode and a second mode, wherein in the first mode the data processing means executes the data store process in preference to the data delivery process by suspending the data delivery process upon detecting a predetermined input condition, and in the second mode the data processing means continuously executes the data delivery process in preference to the data store process upon detecting said predetermined input condition.

2. The data processor according to claim 1, wherein the data processing means comprises an input buffer for temporarily storing data inputted from the keyboard before the data store process is executed by the data processing means and the preference means determines whether the input buffer contains data input from the keyboard that the data processing means has not stored in the data memory, and wherein the preference means directs the data processing means to execute the data store process when it is determined that the input buffer contains data that has not been stored in the data memory.

3. The data processor according to claim 2, wherein the first mode is a background print mode and the second mode is a foreground print mode.

4. The data processor according to claim 3 wherein the data memory includes a print data memory and the data store process converts data input from the keyboard into secondary data that the printing device can process and stores the secondary data as print data in the print data memory.

5. The data processor according to claim 4, wherein print data is stored in the print data memory in at least one named file to be printed by the printing device and the data processing means comprises:
   a print reservation memory for storing an order of print data for each of the named files of print data in the print data memory; and
   print control means, connected to the print reservation memory, for directing the data delivery process to deliver files of print data to the printing device according to the order of print data stored in the print reservation memory.

6. The data processor according to claim 5, wherein the print control means delivers the print data in the print data memory to the printing device when the name of at least one file of the print data is present in the print reservation memory.

7. The data processor according to claim 6, wherein the print reservation memory further stores a printing mode data for each file, the printing mode data indicating that the file is to be printed either in the foreground print mode or the background print mode.

8. The data processor according to claim 7, wherein the data processor further comprises:
   a display; and
   print reservation setting means for displaying a print reservation screen on the display and directing an operator to input the order of print data and the printing mode data for each of the named files of print data stored in the print reservation memory.

9. The data processor according to claim 8 wherein the data memory includes a display memory and the data store processing includes a process of converting data inputted from the keyboard into display data for displaying on the display, storing the display data in the display memory and displaying the display data on the display.

10. A data processor for processing of key input data comprising:
    a keyboard for inputting data including text data, name data of at least one file of the text data, and printing priority data;
    a display;
    a print data memory;
    a printing device;
    data processing means connected to the keyboard, the display, the printing device, and the print data memory for executing a data store process responsive to data input from the keyboard to convert the inputted text data into print data to be printed by the printing device, storing the print data in the print data memory, and converting the text data into display data to be displayed on the display, and for executing a delivery process to deliver the print data from the print data memory to the printing device;
    preference means connected to the data processing means for selecting between a first mode and a second mode, wherein in the first mode the data processing means executes the data store process in preference to the data delivery process by suspending the data delivery process upon detecting of a predetermined input condition, and in the second mode the data processing means continuously executes the data delivery process in preference to the data store process upon detecting said predetermined input condition;

a page print key provided on the keyboard for designating a displayed page of a file of text data as a designated page; and a print reservation memory connected to the data processing means for storing the printing priority data of text data stored as print data in the print data memory and to be printed by the printing device;

wherein, responsive to the page print key operation, the data processing means converts the designated page into a file of page print data, stores the file of page print data in the print data memory, and stores the printing priority data of the designated page in the print reservation memory.

11. The data processor according to claim 10, wherein the first mode is a background print mode and the second mode is a foreground print mode.

12. The data processor according to claim 11 wherein the print reservation memory further stores a printing mode for each file, the printing mode being either the foreground print mode or the background print mode.

13. The data processor according to claim 12 wherein the data processing means delivers the print data in the print data memory to the printing device at a time when the name of at least one file and at least one page number of the file are present in the print reservation memory.

14. The data processor according to claim 10, wherein the page print key operation also designates a page number of the designated page of text data as the page number of the file of page print data.

15. The data processor according to claim 14, wherein the page number designated by the page print key operation is the page number of a page at which a cursor is situated on the display when the page print key is operated.

16. A data processor comprising:

a keyboard for inputting data including text data and name data of a file of the text data;

a display;

a printing device;

data processing means, connected to the keyboard, the display and the printing device, for executing a data store process in response to data input from the keyboard that converts the inputted data into print data to be printed by the printing device and into display data to be displayed on the display, and for executing a delivery process to deliver the print data to the printing device; and preference means connected to the data processing means for selecting between a first mode and a second mode, wherein in the first mode the data processing means executes the data store process in preference to the data delivery process by suspending the data delivery process upon detecting of a predetermined input condition, and in the second mode the data processing means continuously executes the data delivery process in preference to the data store process upon detecting said predetermined input condition;

a page print key provided on the keyboard for designating a designated page of text data; and wherein the data processing means, responsive to the page print key operation, executes the data store process by converting the designated page of text data into a file of print page data and storing the file of page print data in a print data memory.

17. The data processor according to claim 16 wherein the page print key operation designates a page number of a page on which text data is displayed on the display as the page number of the file.

18. The data processor according to claim 17 wherein the page print key operation designates a page number of a page at which a cursor is situated on the display as the page number of the file.

* * * * *